Patented Oct. 19, 1943

2,332,196

UNITED STATES PATENT OFFICE 2,332,196

FRICTION REDUCING SURFACE COATING

Johan Bjorksten, Chicago, Ill., assignor to Johan Bjorksten, Philadelphia, Pa., as trustee for Oliver J. W. Bjorksten No Drawing. Application October 4, 1940, Serial No. 359,725

5 Claims. (Cl. 244—130)

This invention relates to surface coatings, and particularly to substantially permanent coatings of friction reducing properties, which when applied to vehicles such as airplanes or ships, reduce the friction between such vehicles and the media in which they are moving, and thereby make possible higher speeds with unchanged power consumption, or unchanged speeds with reduced power consumption.

A principal object of the invention is apparent from the above paragraph.

Other objects are new and useful surface coatings.

Another object is a new procedure for applying lubricating surface coatings.

Other objects are power driven vehicles characterized by having a substantially permanent low friction surface covering.

Another object is an article of metal, having a surface coating of permanent character and of exceptionally low friction coefficient.

Other objects are processes for forming friction reducing surface coatings of substantially permanent character.

Further objects will become apparent from the following detailed description:

I have found that if a substantial percentage of graphite is incorporated in a surface coating medium, and this is applied to a surface, and brought to form a film in any of the numerous manners well known to the art, the resultant film will have qualities of a lubricated surface, and will preserve these properties for substantially the life of the coating.

Because of the extreme smoothness of such a surface, and of its very low coefficient of friction with water and air, vehicles having a surface coating of this invention will present less resistance to air and to water, particularly when moving at high velocities, than vehicles having coatings such as previously used. Therefore, the speed of a fast vehicle moving through a medium such as air or water, may be increased about 2 to 5% by the use of the surface coatings of this invention, or, if a constant speed is maintained, the power required for the maintenance of such speed may be commensurately reduced. The higher the speed of the vehicle, the more marked is the advantage derived from the invention.

With the term "vehicle" as used in the specification and claims of this application, I understand any object moving through a surrounding medium. In particular, the invention is advantageous when applied to power driven vehicles, moving at high velocities, such as airplanes or fast sea going vehicles, such as motor boats, steamships of all classes, torpedoes and the like; but it is also applicable to bodies moving through such media without active propulsion, but under the influence of inertia, gravity, or like forces. For example, when applied to aerial bombs, the invention results in somewhat more rapid passage, through the air, and in reduced deviations under the influence of horizontal air currents, or of the Magnus effect; and in a consequent increase in the accuracy of aim.

In seagoing vehicles the major part of the friction occurs in the submersed parts of the vehicle, and therefore, it is particularly desirable to apply the invention to such submersed parts.

The invention generally contemplates surfaces covered with a surface coating containing throughout, or at least at its outermost part, graphite in amount sufficient to substantially reduce the friction on surface contact with surrounding media, and in particular articles of manufacture comprising metal so treated. It is immaterial to the invention whether the graphite carrying coating is applied directly onto the metal, or if it is applied to other coatings which in turn rest on the metal; of essence is only that the surface which is in immediate contact with the surrounding medium contains graphite in amounts sufficient for the purposes of the invention.

The best results are obtained if the amount of graphite in the surface coating exceeds the weight of other solid materials present, but appreciable benefits are derived even if the graphite constitutes only 30% of these solids materials, and some advantages may be secured even if ten per cent, and even less of graphite is incorporated.

The chemical composition of surface coating vehicles in which the graphite is suspended, or to which the graphite is applied, is irrelevant to the invention. I may use as a vehicle for the graphite any surface coating medium known in the art; for example, drying oils, such as linseed, oiticica and tung oils, resin solutions, shellacs and the like, synthetic finishes or baking lacquers of phenol-aldehyde resin types, protein compositions such as caseinate paints, or alcohol soluble proteins of the prolamin type, such as zein, cellulose ester or ether lacquers, and the like, and any combinations of such ingredients that have properties suitable for coating purposes.

The compositions may further include any ingredients used in the paint or varnish or lacquer trades, such as fillers, pigments, dyes, anti-blushing agents, anti-skinning agents, antiseptics, fungicides, shipworm repellant chemicals, plasticizers, solvents, thinners, blending agents and the like.

From these vehicles, a material adapted as graphite carrying vehicle may be selected in each particular instant, depending on the requirements of the particular application in view. For example, for application to a ship, I generally would prefer a vehicle of drying oil type, such as a linseed oil varnish containing a small amount of lead-manganese dryer, possibly with some lead pigment. For application to an airplane, I generally would prefer a nitrocellulose or an acetyl cellulose lacquer type vehicle, fairly well plasticized. Generally materials selected from the group consisting of cellulose esters and ethers would be suitable. For some small, protruding instrument part on a fast moving vehicle, I would prefer a baking enamel vehicle. In each of these instances, if the amount of graphite present would be so large as to increase the viscosity of the mix to a point rendering application inexpedient, I would add a thinner in amount sufficient to reduce the viscosity to a point rendering application more convenient. The exact amount of thinner to be added for this purpose could be readily ascertained in each specific case by brush or spraying test in manner obvious to those skilled in the art.

If a composition of this invention is to be superimposed on a different coating, I often prefer to use a vehicle which is substantially a non-solvent for the underlying coating, but which will give a coating of good adhesion thereto.

For example, if the underlying coating is a nitrocellulose coating, I may use a linseed oil vehicle to carry the graphite, and in order to secure good adhesion I prefer to use in this vehicle a substantial proportion of a nitrocellulose compatible grade of linseed oil.

If the underlying layer is a drying oil type coating, I prefer to employ as the vehicle for the graphite an alcoholic solution, either of a prolamine, or of shellac, or a solution of a nitrocellulose ester in a readily volatile solvent, such as ethyl acetate, with a minor amount of plasticizers, or I may use a drying oil vehicle preferably of relatively short drying time, or a solution of hydrocarbon resin, for example, of the type disclosed and claimed in the co-pending application, Serial No. 213,185, to R. Waller and C. Gustafsson, filed June 11, 1938, or in the co-pending application Serial No. 238,440 to C. Gustafsson, filed November 2, 1938.

The following specific examples illustrate the invention:

*Example 1*

| | Parts by weight |
|---|---|
| Linseed oil varnish | 50 |
| Cobalt naphthenate drier | ¼ |
| Finely powdered graphite | 50 |
| Turpentine thinner | ¹ 30 |

¹ Or sufficient to give the consistency desired

The ingredients are mixed thoroughly. The composition is applied by brushing onto the surfaces desired to cover, and, when applied as bottom coat for a ship, will increase the speed of the ship by reducing friction.

*Example 2*

| | Parts by weight |
|---|---|
| Shellac | 10 |
| Graphite | 20 | are milled together 2 hours in a ball mill. The mixture is then agitated with ethyl alcohol in quantity sufficient to give a shellac solution and graphite suspension of the viscosity desired for the application in view. Usually about 35 parts of alcohol will be sufficient.

The composition is applied by brushing onto a surface painted with a drying oil type paint.

*Example 3*

| | Parts by weight |
|---|---|
| Shellac | 10 |
| Ethyl alcohol | 100 | are brought to homogeneous solution by agitating at a slightly elevated temperature. To this solution is added 1 part by weight of graphite dust of the finest particle size available.

*Example 4*

| | Parts by weight |
|---|---|
| Zein | 10 |
| 80% ethyl alcohol | 90 |
| Graphite | 16 |

*Example 5*

| | Parts by weight |
|---|---|
| Defibrinated blood | 5 |
| Calcium hydroxide | 1½ |
| Water | 10 |
| Powdered graphite | 7 |

*Example 6*

| | Parts by weight |
|---|---|
| Phenyl formaldehyde resin known in the trade as "Bakelite resin BR 2963" | 200 |
| "Q" body linseed oil | 480 |

These ingredients are heated together 2 hours at 575 degrees Fahrenheit, then allowed to cool to 400 degrees F., whereupon the following ingredients are added, and thoroughly intermixed:

| | Parts by weight |
|---|---|
| Graphite | 500 |
| Hydrocarbon thinner "Solvesso No. 2" | 700 |
| 24% lead "Nuodex" | 6 |
| 6% cobalt "Nuodex" | 2½ |
| 30% solution of chlorinated rubber "20 centipoise type" in Xylol | 250 |

This composition is applied to the object to be coated, then baked until the coating has hardened (usually about 16 hours).

*Example 7*

| | Parts by weight |
|---|---|
| Colophonium | 100 |
| Crystallized sodium carbonate | 20 |
| Water | 50 |
| Powdered graphite | 120 |

The above are boiled together, then intermixed with 250 parts by weight of water and 24 parts by weight of concentrated ammonia.

*Example 8*

100 parts by weight of a petroleum resin solution prepared according to Example 1 in the co-pending application, Serial No. 213,185, filed June 11, 1938, to R. Waller and C. Gustafsson, and containing 40% of a chlorine containing petroleum resin.

| | Parts by weight |
|---|---|
| Blown linseed oil | 20 |
| Finely powdered graphite | 35 |
| Penta chloro phenol | 2 | are thoroughly mixed, and if necessary diluted with a small amount of petroleum thinner to reduce the viscosity.

*Example 9*

| | Parts by weight |
|---|---|
| A nitrocellulose commercially known as "½ second cotton" | 25 |
| Castor oil | 7 |
| Ortho toluene ethyl sulfon amid | 3 |
| Finely powdered graphite | 20 |
| Ethyl acetate, or more if a lower viscosity is desired | 85 |

The above composition is thoroughly mixed, and is then applied to an airplane fuselage and wings by spraying.

To fully bring out the friction reducing qualities inherent in the above compositions, it is generally preferable to allow the compositions to dry substantially to hardness after application, and then to rub the surface thoroughly with soft cloth, or the like. This treatment will remove any microscopic roughness present in the coating, and will spread the graphite particles imbedded and anchored in the coating vehicle so as to form a substantially continuous, yet firmly anchored surface layer of graphite, of extreme smoothness and consequent freedom from resistance to media through which it may be propelled. However, such rubbing treatment, while generally desirable, is not essential to the invention, because the friction to which these coatings will be exposed under the conditions of use contemplated, will over a period of time effect the necessary smoothing of the graphite.

While I generally prefer to apply the graphite in a surface coating medium, as fully disclosed in the above description and examples, I may in some instances find it convenient to follow a somewhat different procedure. I may first apply to the object to be treated a surface coating vehicle of any of the types previously known, and while the surface is still wet, or at least tacky or impressionable, apply thereto graphite so as to substantially cover the surface therewith. The method of application of this graphite is not essential to the invention. I may rub it in, brush it onto the wet or tacky surface, blow it, or dust it onto the surface, or immerse the surface in a container of finely powdered graphite, or use any other procedure known in the art for applying finely comminuted solids to a surface.

The graphite particles will then adhere to the wet or tacky surface, and will be at least to some extent imbedded therein or adherent thereto. When the coating material hardens, the graphite particles will be quite firmly anchored to the surface, and a rubbing, or mild friction directed to the surface, either as a separate operation or in the normal course of use, will spread out the graphite on the surface so as to produce a substantially continuous graphite layer thereon, which will impart to the object or the vehicle so treated the extreme smoothness characteristic of graphite films, and conducive to the benefits above described.

Obviously, if the coating to which it is desired to anchor the graphite coat has already dried, sufficient tack may be imparted to it by wiping or spraying it with a volatile solvent for the coating material employed, and the graphite may then be applied thereto, as disclosed in the previous paragraph.

The compositions, methods and procedures outlined above are manifestly capable of wide variations without departure from the spirit and scope of the invention. The specific examples have been given only to illustrate, and should therefore, not be construed to imply any restriction of the invention, which is to be limited only by the scope of the claims, in which it is intended to claim the invention as broadly as possible, in view of prior art.

I claim:

1. An airplane having thereon a coating comprising a prolamine and graphite, said coating being adapted to reduce the friction between said airplane, and air.

2. A projectile having thereon a coating comprising a prolamine and graphite, said coating being adapted to reduce the friction between said projectile, and air.

3. A ship hull having thereon a coating, comprising a prolamine and graphite, said coating being adapted to reduce the friction between said ship hull, and air.

4. A moving body, having thereon a coating comprising a prolamine and graphite, said coating being adapted to minimize the friction between said moving body and the fluid medium through which the said body is moving.

5. A moving body, having thereon a coating comprising zein and graphite, said coating being adapted to minimize the friction between said moving body and a fluid medium through which the said body is moving.

JOHAN BJORKSTEN.